United States Patent [19]

Berguer

[11] E Patent Number: Re. 33,090

[45] Reissued Date of Patent: Oct. 17, 1989

[54] ISOTHERMIC PROTECTIVE BOOT

[75] Inventor: Ramon Berguer, West Bloomfield, Mich.

[73] Assignee: Lunax Corporation, New Baltimore, Mich.

[21] Appl. No.: 199,921

[22] Filed: May 27, 1988

Related U.S. Patent Documents

Reissue of:

[64] Patent No.: 4,369,588
Issued: Jan. 25, 1983
Appl. No.: 227,367
Filed: Jan. 22, 1981

[51] Int. Cl.[4] ..... A43B 1/02; A43B 1/10; A43B 7/14

[52] U.S. Cl. ..... 36/9 R; 30/93; 30/4; 128/892

[58] Field of Search ..... 36/4, 93, 9 R, 83, 7.3; 128/892

[56] References Cited

U.S. PATENT DOCUMENTS

| | | | |
|---|---|---|---|
| 3,511,233 | 5/1970 | Hory, Jr. | 128/892 |
| 3,691,658 | 9/1972 | DiPerno et al. | 36/4 |
| 3,936,959 | 2/1976 | Hanson et al. | 36/93 |
| 4,076,022 | 2/1978 | Walker | 128/892 |
| 4,150,442 | 4/1979 | Boone | 128/892 |
| 4,197,845 | 4/1980 | Browning | 128/892 |
| 4,294,022 | 10/1981 | Stockli et al. | 36/4 |

OTHER PUBLICATIONS

"Posey Heel Protector-Ventilated", Publication Date: unknown, p. 1.
"Night Splint-Heel Protector-A Summary", AliMed, Publication Date: unknown, p. 1.
"A Unified Concept in Patient Positioning", American Hospital Supply, Publication unknown, pp. 1-2.
"SpanAids Foot-Drop Stop", Span-America Inc., Pub. unknown, pp. 1-2.
"The Bunny Line of Orthopedic Aids", Dillion Mfg. Co, Inc., pp. 1-2, 1979.
Contour Fabricators, Inc., "Orthocare Brand Therapeutic Patient Supports", 3/1982, pp. 1-16.
"Spaceboot-Plastic-Foam Drop Foot Splint", Contour Fabricators, Inc., 1978, pp. 1-2.
"The New Improved Bunny Boot", Dillion Mfg. Co., Inc., 1979, pp. 1-2.
"Space Splint, "Author: unknown, Publication Date: unkown, p. 1.
"Alba Heel and Elbow Protector", Alba Healthcare, Publication Date: unknown, p. 1.
"Orthocare Brand Therapeutic Patient Supports", Controu Fabricators Inc., Mar. 1982, pp. 1-16.
"Process Systems Services", LaMed, Inc., 11/1981, p. 1.
"Protective Device for a Decubitus Ulcer", Blumenthal and Wanchik, Oct. 1970, pp. 1-2.
"Management and Rehabilitation of Burns", O'Shaughnessy and Heimbach, Pub. Date: unknown, pp. 1-5.

*Primary Examiner*—Steven N. Meyers
*Attorney, Agent, or Firm*—Barnes, Kisselle, Raisch, Choate, Whittemore & Hulbert

[57] ABSTRACT

An isothermic protective boot designed particularly for patients with arterial disease. The boot has a complete inner lining and outer cover of a soft, non-allergenic material, a double layer of a soft, flexible, compressible isothermic protective material between the outer cover and inner lining, and a body of flexible, compressible weight-bearing material at the back of the boot in a position to extend along the heel cord and lower aspect of the calf of the patient's leg.

23 Claims, 3 Drawing Sheets

ISOTHERMIC PROTECTIVE BOOT

Matter enclosed in heavy brackets [ ] appears in the original patent but forms no part of this reissue specification; matter printed in italics indicates the additions made by reissue.

This invention relates generally to protective boots and refers more particularly to an isothermic protective boot for bedridden patients with arterial disease.

BACKGROUND AND SUMMARY

Patients with severely ischemic legs may have, in addition to low perfusion of their feet, vasoconstriction of skin vessels which renders their skin more susceptible to otherwise trivial trauma (decubitus). This peripheral vasoconstriction can often be abolished by surgical or pharmacological sympathectomy. It can also be avoided with bulky isothermic dressings which promote autonomic dilation of skin vessels.

When lying in bed a good portion of the weight of the extremity of the patient rests on the posterior aspect of the heel. Patients with ischemic extremities are prone to develop ulcerations in this pressure point which, once established, nearly always necessitates an amputation unless an arterial reconstruction is possible.

In patients with severely ischemic legs other trivial injuries may occur with the limited ambulation which is allowed to them. A small abrasion caused by contact with the edge of the bed or chair may result in a non-healing ulceration with catastrophic results.

One protective appliance that has been used in the past consists of a cylinder of synthetic or natural cotton which is wrapped around the foot and lower leg and is held in place by a tubular elastic net. However, removal and reapplication for inspection and care is awkward and after minimal ambulation they must be discarded and replaced.

A general object of the present invention is to provide a boot which gives improved protection for the foot and lower leg of a patient who may, for example, be suffering from arterial disease.

The boot of the present invention has the following characteristics:

(1) It may be worn by patients in bed and also allows limited ambulation (to bathroom, at bedside, etc.).

(2) It protects the foot from trauma.

(3) It is isothermic and, to the extent possible, prevents heat loss from the foot, while at the same time permitting breathing and evaporation of sweat from the skin surface.

(4) It distributes the weight of the extremity over a large surface area. The design takes into consideration the fact that the weight bearing surface when the patient is lying down will not be at the bottom of the heel but rather over the heel cord and the lower aspect of the calf on a much wider area than that upon which the foot would normally rest. By transferring the weight of the extremity to a much larger area, the effective pressure insult on the skin is diminished.

(5) It is soft and will reach to the junction of the lower and middle third of the calf.

(6) Because it is intended for use by individuals who oftentimes have infection or ulcerations in the foot, the boot is designed to be disposable.

(7) It is not so costly that it cannot be discarded after use by a patient in the hospital.

(8) It allows for easy opening of the boot for inspection and care purposes.

(9) It is free of hard surfaces or corners on the outer surface to avoid injury to the other extremity of the patient since it will be used in most cases by bedridden patients.

These and other objects will become more apparent as the following description proceeds, especially when considered with the accompanying drawings.

DETAILED DESCRIPTION

Referring now more particularly to the drawings, the boot is constructed essentially of four parts, namely a main body portion 10, a bottom tread portion 12, an insole 14 and a body or insert 16 of weight-bearing material.

Figure 1:
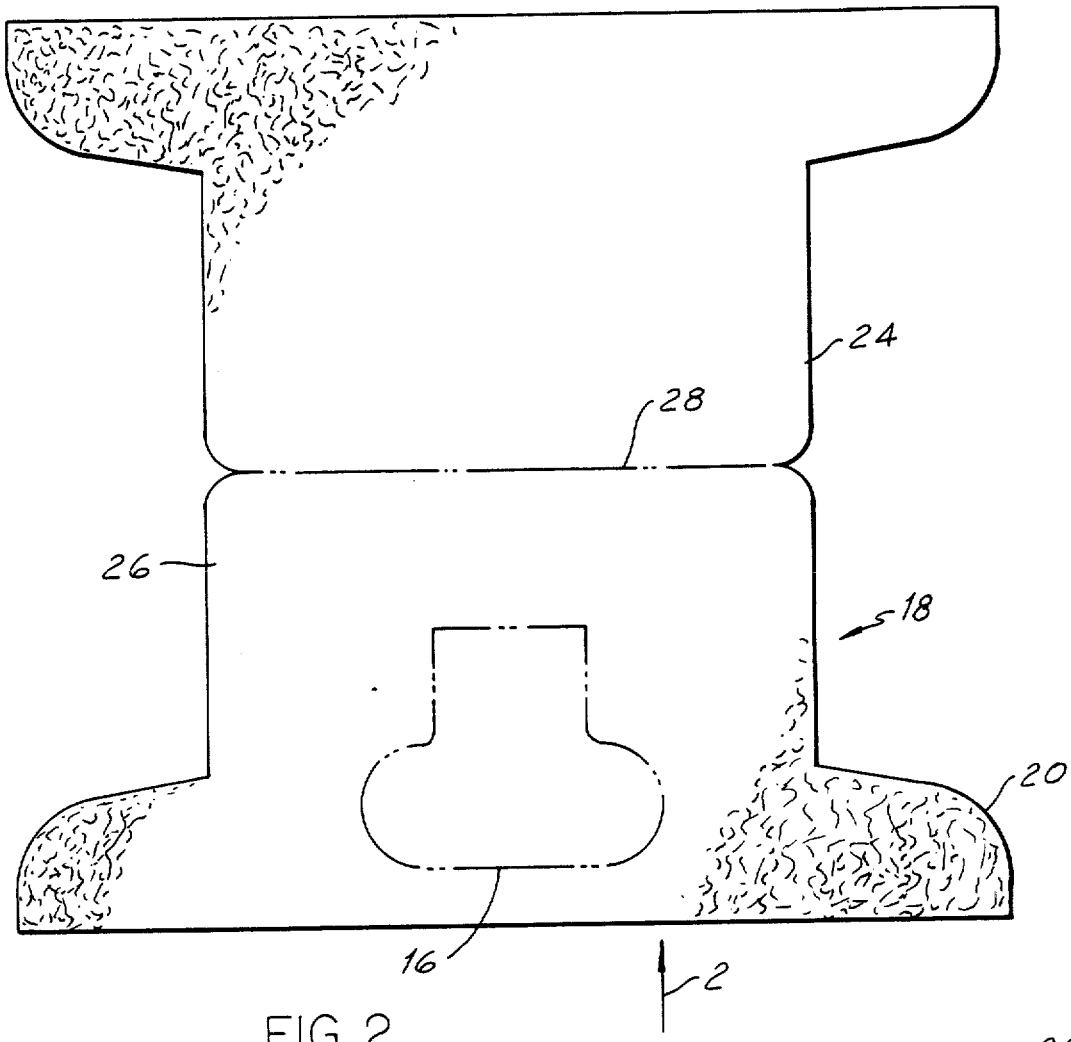
FIG. 1 is a plan view of a lamination from which the main body portion of the boot of this invention is formed.
Figure 2:
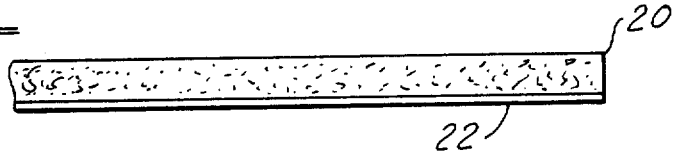
FIG. 2 is an edge view of FIG. 1 looking in the direction of the arrow 2.

The main body portion 10 is formed initially as a flat lamination 18 (FIG. 1) and is composed of a sheet 20 of relatively soft, flexible, compressible, protective, cushion material and a flexible cover sheet 22 secured to one side of the sheet 20. Both sheets are cut to the configuration shown in FIG. 1.

The sheet 20 is formed of isothermic heat-insulating material which is preferably porous and prevents, as much as possible, the dissipation of heat from the foot, while at the same time permitting breathing and evaporation of sweat from the skin surface. While expanded polyurethane is preferred as the material of the sheet 20, other materials such, for example, as natural foam rubber or any suitable synthetic flexible foam, either open or closed cell, may be used. As more fully described hereinafter, the sheet 22 will provide a cover for both the inside and outside of the boot and should be relatively soft, gentle and non-allergenic so as not to irritate the skin of the foot and lower leg protected by the boot nor to injure the other extremity of a patient who in most cases will be bedridden. The sheet 22 may, for example, be made of paper, non-woven urethane, cotton or any natural or synthetic material which is sufficiently gentle and non-abrasive. The sheets 20 and 22 may be heat-bonded together or adhered to one another by a suitable adhesive.

Figure 6:
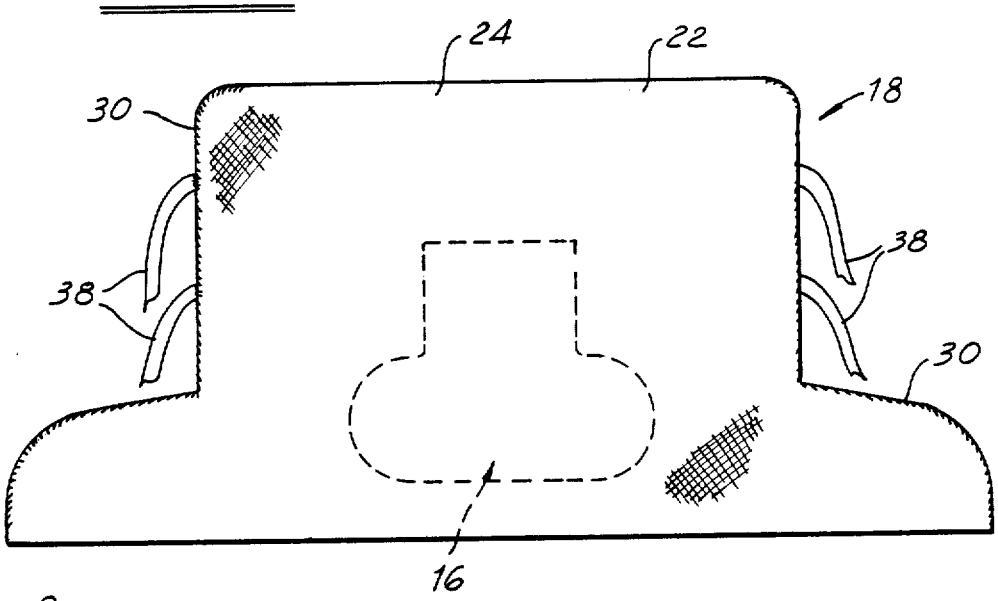
FIG. 6 is a view of the lamination of FIG. 1 after the upper half has been folded over the lower half.
Figure 10:
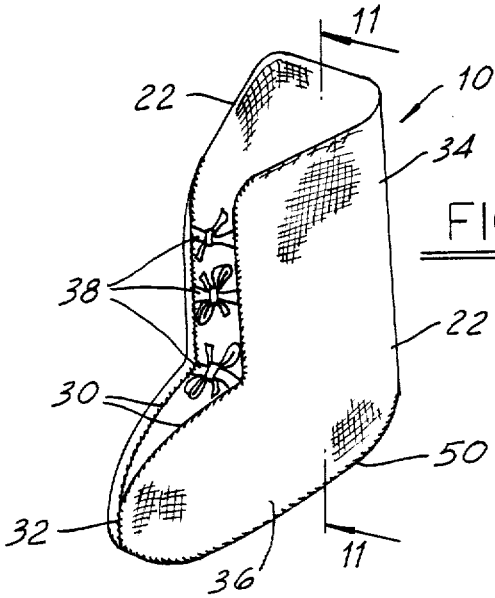
FIG. 10 is a perspective view of the boot.

The flat lamination 18 is composed of two portions 24 and 26 which are identical in configuration and joined along an imaginary fold line indicated at 28. These portions 24 and 26 are folded together along the fold line 28 with the cover sheet 22 on the outside of the fold. The co-extending side edges are stitched together where indicated at 30 (FIG. 6), the portions on either side of an imaginary central vertical line in FIG. 6 are brought toward one another and stitched together at the toe of the boot where indicated at 32 to form the main body portion 10 composed of a leg-receiving part 34 and the top and sides of the foot-receiving part 36 (see FIG. 10). The entire main body portion 10 is covered on the inside and outside by the cover sheet 22 and has two layers 37 of cushion material 20 within. The main body portion 10 is completed by the application of ties 38 to the stitched edges 30 either before or after stitching of the toe at 32. Such ties may also be applied by stitching or by any other suitable means.

Figure 3:
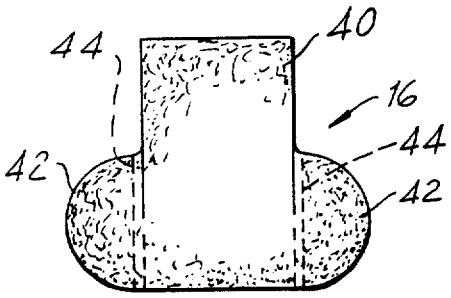
FIG. 3 is a detail view in elevation of an insert or body of weight-bearing material for the boot.
Figure 4:
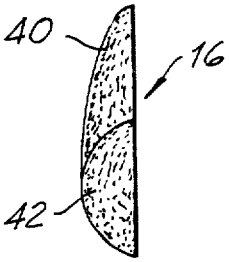
FIG. 4 is a side view of the insert.
Figure 5:
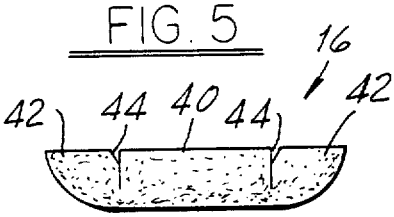
FIG. 5 is a bottom view of the insert.
Figure 11:
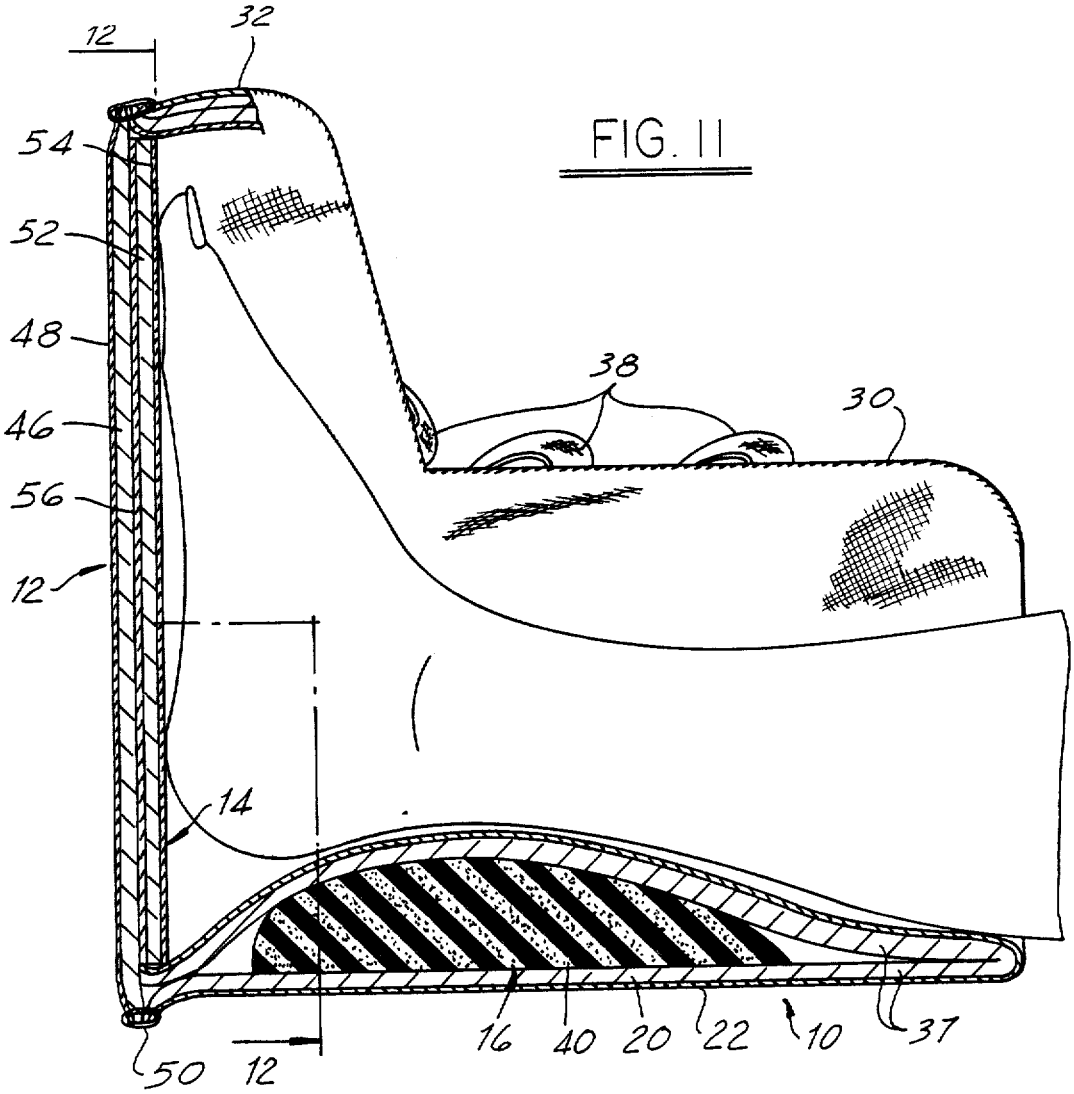
FIG. 11 is a sectional view taken on the line 11—11 in FIG. 10.
Figure 12:
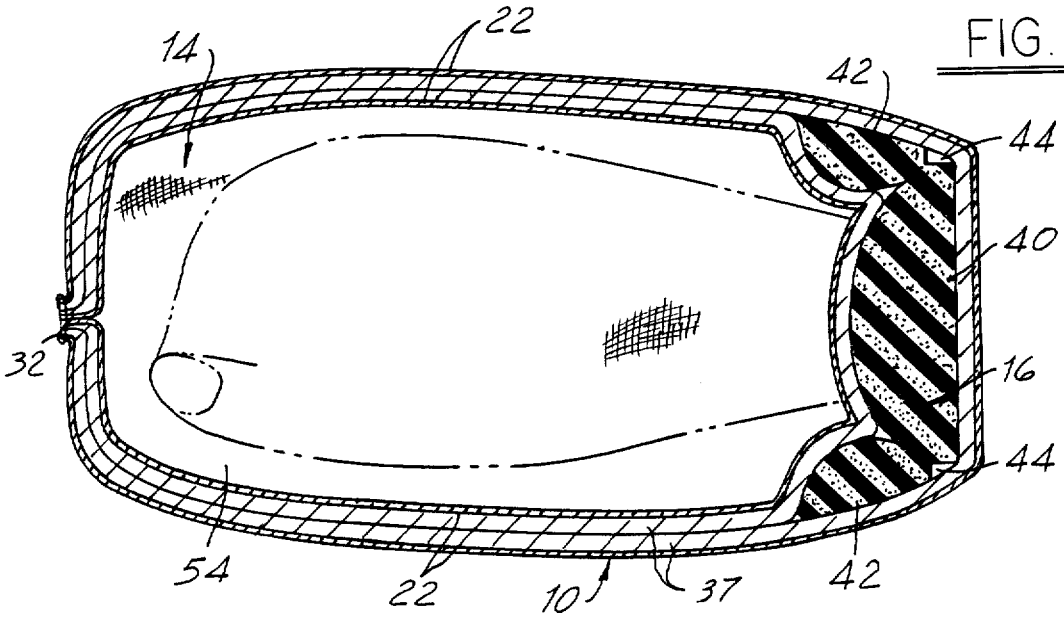
FIG. 12 is a sectional view taken on the line 12—12 in FIG. 11.

The body 16 of weight-bearing material is of the configuration best shown in FIGS. 3–5. It may be formed of the same material as sheet 20 and, while it is both flexible and compressible, it is firmer, that is not as easily compressed, as the sheet 20. The body 16 has a rectangular central portion 40 separated from lower wing portions 42 by grooves 44. The body 16 is disposed between the two layers 37 of cushion material in the position shown in FIG. 6 (also as shown in phantom lines in FIG. 1). No special securing means are required to retain the body 16 in place. In this position, the central portion 40 of body 16 is disposed upright and midway between the opposite stitched edges 30, with the wing portions 42 projecting laterally outwardly from the lower part of the central portion 40. The central portion 40 is at the back of the boot overlapping the foot and leg-receiving portions (see FIG. 11) in position to extend along the heel cord of the patient. The wing portions fold forwardly along grooves 44 when the sides of the main body portion 10 are brought together and stitched at the toe (see FIG. 12). The central portion 40 is convexly curved in a vertical plane as shown in FIG. 11 to follow the general contour of the heel cord and lower aspect of the calf. The wing portions 42 protect the ankle at opposite sides of the heel cord.

Figure 9:
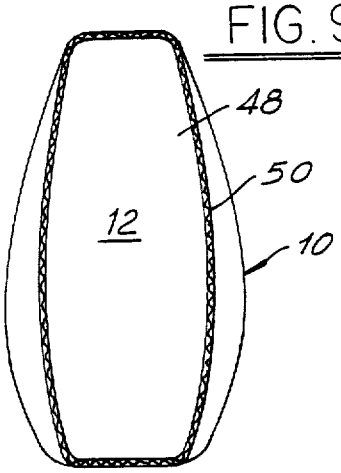
FIG. 9 is a bottom plan view of the boot.

The bottom tread portion 12 is shaped as indicated in FIG. 9. It is composed of a flexible, compressible sheet 46 which may be of the same material and softness as the sheet 20, and a flexible cover sheet 48 secured to one side of the sheet 46. Sheet 48 may be formed of the same material as sheet 22 and may be heat-bonded to sheet 46 or adhered thereto by a suitable adhesive. Both sheets 46 and 48 are cut to the same configuration.

The bottom tread portion 12 is stitched to the lower margin of the main body portion 10 of the boot where indicated at 50 with the cover sheet on the outside and the cushion sheet on the inside of the boot.

Figure 7:
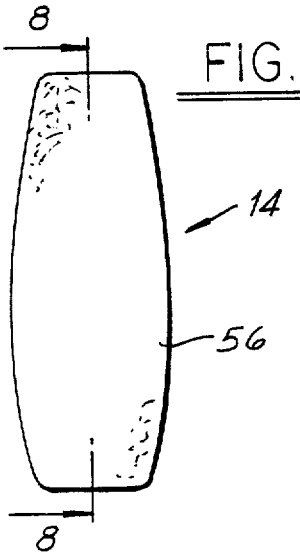
FIG. 7 is a detail view in elevation of the insole of the boot.
Figure 8:
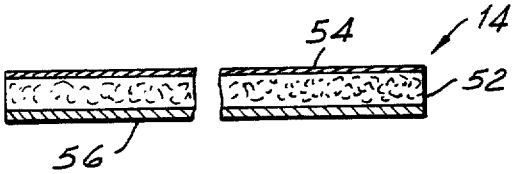
FIG. 8 is a sectional view taken on the line 8—8 in FIG. 7.

The insole 14 is shaped as shown in FIG. 7. It is composed of a flexible, compressible sheet 52 which may be of the same material and softness as the sheet 20, and a flexible cover sheet 54 secured to one side of the sheet 52. Sheet 54 may be formed of the same material as sheet 22 and may be heat-bonded to sheet 52 or adhered thereto by a suitable adhesive. A sheet 56 of cardboard or like material which is somewhat flexible (but substantially less flexible than sheets 52 and 54) is secured to the opposite side of sheet 52 as by an adhesive. The sheets 52, 54, and 56 are cut to the same configuration which is generally similar to that of the bottom tread portion 12.

Insole 14 is inserted in the boot with the cardboard side down. The insole may remain loose, but preferably the cardboard side is secured to the sheet 46 of the bottom portion 12 by a suitable adhesive.

The boot provides a complete protective cover for the foot and calf portion of the leg of a patient, the leg-receiving part 34 being dimensioned to extend up to about the junction of the lower and middle third of the calf.

The boot is open along a continuous parting line defined by the confronting edges 30 from the top of the leg-receiving part 34 to the beginning of the stitching 32 at the toe of the boot. The entire lower calf portion and foot of the patient are covered and protected by the boot, except for the small gap between the edges 30. The gap can be practically eliminated by pulling the edges 30 together by means of the ties 38. The ties may, of course, be released to permit the boot to be opened along the edges 30 for inspection purposes or to apply or remove the boot. *The ties 38 constitute releasable fastening means for the front of the boot to provide a connection between the confronting edges 30.*

The entire inside of the boot has a complete inner lining of relatively soft, non-allergenic material provided by the cover sheet 22 of the main body portion 10 and the sheet 54 of insole 14. The entire outside of the boot has a complete outer cover of the same relatively soft, non-allergenic material provided by the cover sheet 22 of the main body portion 10 and the sheet 48 of tread portion 12. The sheet 22 also covers the top edge of the leg-receiving part 34 of the boot. The outside contour of the boot is smooth and free of sharp edges or corners to prevent injury to the patient's other extremity.

The boot provides a complete double layer of the isothermic heat-insulating material of which the sheets 20, 46, and 52 are made for the purpose of preventing, as much as possible, the dissipation of heat from the foot and lower leg while at the same time permitting breathing and evaporation. These soft layers of heat-insulating material also protect the foot and lower leg from trauma. It will be appreciated that the weight-bearing surface of the extremity of the patient when lying down will be over the heel cord and the lower aspect of the calf and the weight will be supported over a large area by the layers 37 of the heat-insulating material as well as the body 16 of weight-bearing material (see FIG. 11). Thus the unit pressure on the back of the lower leg of the patient is minimized.

I claim:

[1. An isothermic protective boot having a foot-receiving part and a contiguous leg-receiving part adapted to extend up to at least the lower portion of the calf of a patient, said boot having a complete inner lining of relatively soft, non-allergenic material, said boot also having a layer of relatively soft, flexible, compressible isothermic protective material throughout the full extent of both its parts and a body of weight-bearing material along at least a portion of the back of said leg-receiving part in a position to extend along the heel cord of the wearer such that when the wearer is lying on his back the weight-bearing surface of the extremity of the wearer will be over the heel cord and lower aspect of the calf and not the bottom of the heel.]

[2. An isothermic protective boot as defined in claim 1, wherein said boot has a complete outer cover of a relatively soft material.]

[3. An isothermic protective boot as defined in claim 2, wherein said inner lining and outer cover for the leg-receiving part and the top and sides of said foot-receiving part are portions of a single sheet integrally joined at the top of the leg-receiving part.]

[4. An isothermic protective boot as defined in claim 1 or 2, wherein said isothermic material is expanded polyurethane.]

[5. An isothermic protective boot as defined in claim 1, wherein said inner lining is made of paper.]

[6. An isothermic protective boot as defined in claim 3, wherein said single sheet is made of paper.]

[7. An isothermic protective boot as defined in claim 1, wherein said body of weight-bearing material is flexible and compressible but firmer than said layer of isothermic material.]

[8. An isothermic protective boot as defined in claim 7, wherein said weight-bearing material is expanded polyurethane.]

[9. An isothermic protective boot as defined in claim 1, including an insole disposed inside the boot at the bottom and comprising a layer of said isothermic material with a portion of said inner lining on its upper surface.]

[10. An isothermic protective boot having a foot-receiving part and a contiguous leg-receiving part adapted to extend up to the junction of the lower and middle third of the calf of a patient, said boot having a complete inner lining of a relatively soft, non-allergenic material, said boot having an outer cover of a relatively soft material, said boot also having between said inner lining and outer cover plural layers of relatively soft, flexible, compressible porous isothermic protective material throughout the full extent of both its parts, and a body of relatively soft, flexible, compressible weight-bearing material along at least a portion of the back of said leg-receiving part between said layers of isothermic material in a position to extend along the heel cord of the wearer such that when the wearer is lying on his back the weight-bearing surface of the extremity of the wearer will be over the heel cord and lower aspect of the calf and not the bottom of the heel.]

[11. An isothermic protective boot as defined in claim 10, wherein said boot has a main body portion constituting the entire leg-receiving part and the side and upper portions of said foot-receiving part, a bottom tread portion constituting the bottom of said foot-receiving part and having a portion of one said layer of isothermic material with a portion of said outer cover on its outer surface, and an insole disposed inside said boot in overlying relation to said tread portion and having a portion of another said layer of isothermic material with a portion of said inner lining on its top surface.]

[12. An isothermic protective boot as defined in claim 10, wherein said inner lining and outer cover for the main body portion of said boot are portions of a single sheet integrally joined at the top of said leg-receiving part.]

[13. An isothermic protective boot as defined in claim 10, wherein said isothermic material is expanded polyurethane.]

[14. An isothermic protective boot as defined in claim 10, wherein said inner lining and outer cover are made of paper.]

[15. An isothermic protective boot as defined in claim 10, wherein said body of weight-bearing material is firmer than said layers of isothermic material.]

[16. An isothermic protective boot as defined in claim 15, wherein said body of weight-bearing material is expanded polyurethane.]

[17. An isothermic protective boot as defined in claim 11, wherein said insole has a layer of cardboard on the bottom.]

[18. An isothermic protective boot having a foot-receiving part and a contiguous leg-receiving part adapted to extend up to at least the lower portion of the calf of a patient, said boot having an inner lining of relatively soft, non-allergenic material, and a body of weight-bearing material along at least a portion of the back of said leg-receiving part in a position to extend along the heel cord of the wearer such that when the wearer is lying on his back the weight-bearing surface of the extremity of the wearer will be over the heel cord and lower aspect of the calf and not the bottom of the heel.]

*19. An isothermic protective boot having a foot-receiving part and a contiguous leg-receiving part adapted to extend up to at least the lower portion of the calf of a lower extremity of a patient, said boot having a complete inner lining of relatively soft, non-allergenic material, said boot also having a layer of relatively soft, flexible, compressible isothermic protective material throughout the full extent of both its parts, a body of flexible, compressible weight-bearing material along at least a portion of the back of said leg-receiving part in a position to extend along the heel cord of the patient such that when the patient is lying on his back the weight-bearing surface of the extremity of the patient will be over the heel cord and lower aspect of the calf thus relieving the bottom of the heel of any substantial weight bearing, said boot being sufficiently flexible to afford the patient at least limited ambulation, the exterior of said boot being soft and devoid of hard surfaces and sharp edges to preclude injury to the patient's other extremity, said boot having confronting edges at the front permitting said boot to be opened along said confronting edges to apply and remove said boot, said boot being adapted to cover and protect the lower calf portion and foot of the patient from the rear of the boot around the sides thereof to said confronting edges at the front of the boot, and releasable fastening means for the front of said boot adapted to provide a connection between said confronting edges.*

*20. An isothermic protective boot as defined in claim 19, wherein said boot has a complete outer cover of a relatively soft material.*

*21. An isothermic protective boot as defined in claim 20, wherein said body of weight-bearing material is contoured to preclude concentrations of pressure, especially adjacent the heel.*

*22. An isothermic protectve boot as defined in claim 21, wherein said body of weight-bearing material is between said layer of isothermic protective material and said outer cover, whereby the weight of the extremity is supported over a large area by said layer and body so that unit pressure on the back of the leg is minimized.*

*23. An isothermic protective boot as defined in claim 22, wherein said body of weight-bearing material is separate from and firmer than said isothermic protective material.*

* * * * *